(12) United States Patent
Ota

(10) Patent No.: US 10,906,149 B2
(45) Date of Patent: Feb. 2, 2021

(54) MACHINE TOOL

(71) Applicant: STAR MICRONICS CO., LTD., Shizuoka (JP)

(72) Inventor: Rui Ota, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 0 days.

(21) Appl. No.: 16/471,667

(22) PCT Filed: Jul. 27, 2017

(86) PCT No.: PCT/JP2017/027140
§ 371 (c)(1),
(2) Date: Jun. 20, 2019

(87) PCT Pub. No.: WO2018/154809
PCT Pub. Date: Aug. 30, 2018

(65) Prior Publication Data
US 2019/0381620 A1 Dec. 19, 2019

(30) Foreign Application Priority Data
Feb. 21, 2017 (JP) ................. 2017-030220

(51) Int. Cl.
*B23Q 11/12* (2006.01)
*B23Q 1/42* (2006.01)

(52) U.S. Cl.
CPC ............. *B23Q 11/12* (2013.01); *B23Q 1/42* (2013.01); *Y10T 82/2566* (2015.01); *Y10T 408/91* (2015.01); *Y10T 409/309576* (2015.01)

(58) Field of Classification Search
CPC ......... Y10T 408/91; Y10T 409/309576; Y10T 82/2566; B23Q 11/12; B23Q 11/121;
(Continued)

(56) References Cited

U.S. PATENT DOCUMENTS 2,351,620 A * 6/1944 Kocher ................ B23Q 11/121
184/6.14
3,058,559 A * 10/1962 Ohrnberger ............. F16C 27/00
192/85.13
(Continued)

FOREIGN PATENT DOCUMENTS

CN  201220366   4/2009
CN  201320684   10/2009
(Continued)

OTHER PUBLICATIONS

SIPO, Office Action of CN 201780076786.7 dated Sep. 1, 2020.

*Primary Examiner* — Chwen-Wei Su
(74) *Attorney, Agent, or Firm* — Lex IP Meister, PLLC

(57) ABSTRACT

The invention provides a machine tool capable of expanding the slidable range of the moving unit without making the oil feeding system complicated. A machine tool in which a moving unit slides against a supporting unit with a sliding surface of the supporting unit facing a sliding surface of the moving unit, comprises a first oil groove formed on an unexposed portion of the sliding surface of the supporting unit; a second oil groove formed on an unexposed portion of the sliding surface of the moving unit; and an oil inlet formed on one of the first oil groove and the second oil groove. Lubricant fed through the oil inlet is supplied to the other of the first oil groove and the second oil groove.

2 Claims, 8 Drawing Sheets

(58) Field of Classification Search
CPC .......... B23Q 11/124; B23Q 1/42; B23Q 1/26;
F16C 33/10; F16C 33/103; F16C 29/025;
F16C 32/06; F16C 2332/39
USPC .......................................... 384/12; 184/6.14
See application file for complete search history.

(56) References Cited

U.S. PATENT DOCUMENTS

| | | |
|---|---|---|
| 3,439,581 A | 4/1969 | Howard |
| 4,252,381 A * | 2/1981 | Kimmelaar .............. B23Q 1/38 384/13 |
| 10,590,988 B2 * | 3/2020 | Saraie .................... B23Q 1/017 |
| 2004/0082281 A1 | 4/2004 | Kawahara et al. |
| 2012/0190275 A1 | 7/2012 | Aeschlimann et al. |

FOREIGN PATENT DOCUMENTS

| | | | |
|---|---|---|---|
| EP | 2639011 A1 * | 9/2013 | ......... B23Q 11/0825 |
| GB | 702584 | 1/1954 | |
| JP | 48-44083 | 6/1973 | |
| JP | 50-9182 | 1/1975 | |
| JP | 61-168436 | 7/1986 | |
| JP | 10-15778 | 1/1998 | |
| JP | 2004-142035 | 5/2004 | |
| JP | 2012-152892 | 8/2012 | |

\* cited by examiner

MACHINE TOOL

CROSS-REFERENCE TO RELATED APPLICATION

The present application is a continuation of PCT Application No. PCT/JP2017/027140, filed on Jul. 27, 2017, which claims priority of Japanese Patent Application No. 2017-030220 filed on Feb. 21, 2017. The contents of this application are incorporated herein by reference in their entirety.

BACKGROUND

(a) Field

The present invention relates to a machine tool provided with a moving unit sliding against a supporting unit.

(b) Description of the Related Art

In a well-known machine tool such as a lathe, a slide guide method is used to move a moving unit such as a tool post and a headstock against a supporting unit such as a base and a bed. An oil groove provided with an oil inlet is formed on a sliding surface of the moving unit.

Part of the sliding surface of the moving unit is exposed out of engagement with the supporting unit during operation. An oil groove formed on an exposed surface would cause leakage of oil or biting of chips. An oil groove cannot be formed on an exposed portion of the sliding surface. The slidable range of the moving unit is thereby narrow.

Japanese Patent Application Publication No. H10-15778 discloses an NC lathe provided with a middle base and a fixed guide unit. The middle base on which a headstock is mounted moves to an overhung position beyond the fixed guide unit. An oil groove is formed on a front portion of a sliding surface of the fixed guide unit. An oil groove is formed on a rear portion of a sliding surface of the middle base. Lubricant is supplied to the oil groove of the fixed guide unit through a drill hole from a pipe connected to the fixed guide unit. Lubricant is supplied to the oil groove of the middle base through a drill hole from another pipe connected to the middle base.

SUMMARY

The conventional technology requires the lubricant piping system for both the fixed guide unit and the middle base, causing the oil feeding system to be made complicated. Such problem resides not only in a lathe but in any type of machine tools.

The present invention provides a machine tool capable of expanding the slidable range of the moving unit without making the oil feeding system complicated.

A machine tool in which a moving unit slides against a supporting unit with a sliding surface of the supporting unit facing a sliding surface of the moving unit, the machine tool comprising:
a first oil groove formed on an unexposed portion of the sliding surface of the supporting unit;
a second oil groove formed on an unexposed portion of the sliding surface of the moving unit; and
an oil inlet formed on one of the first oil groove and the second oil groove,
wherein lubricant fed through the oil inlet is supplied to the other of the first oil groove and the second oil groove.

The first aspect of the present invention provides a machine tool capable of expanding the slidable range of the moving unit without making the oil feeding system complicated. The second aspect of the invention provides a machine tool capable of efficiently supplying oil to both the oil groove of the supporting unit and the oil groove of the moving unit.

DETAILED DESCRIPTION

Figure 1:
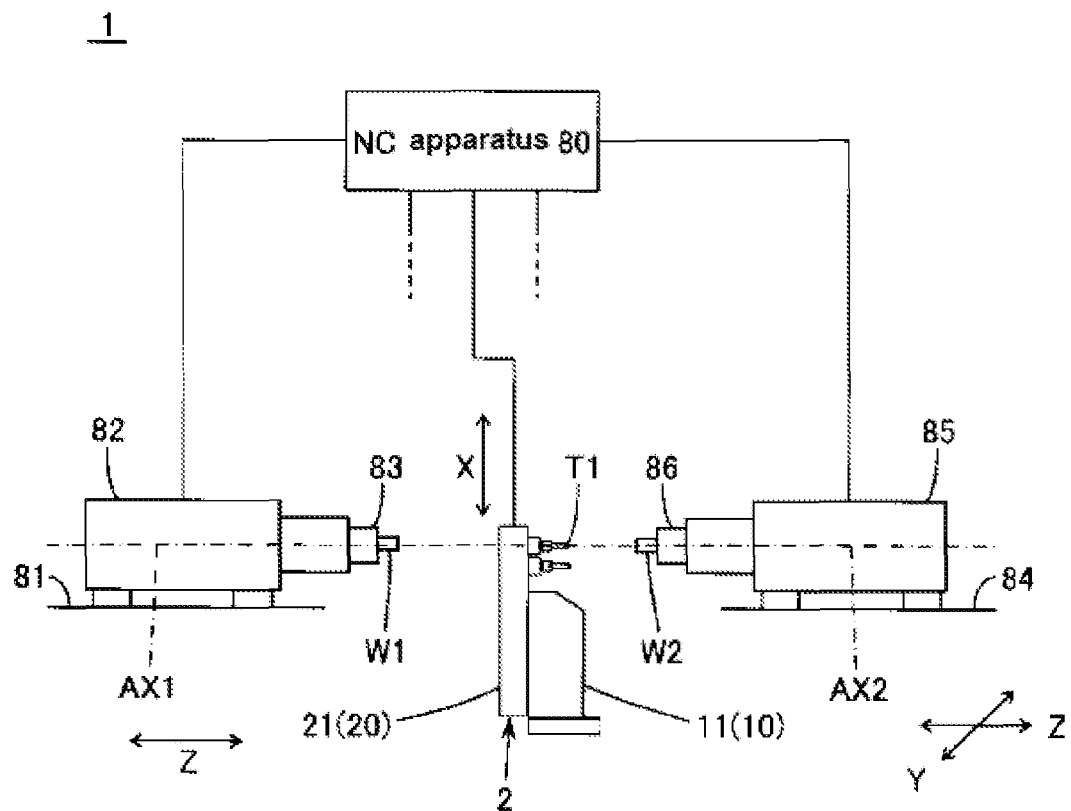
FIG. 1 is a schematic view of the machine tool.

An embodiment of the present invention is being described. The embodiment is only an example of the invention. The features included in the embodiment are not necessarily essential to a solution of the invention.

(1) SUMMARY OF TECHNOLOGY INCLUDED IN THE INVENTION

A summary of technology included in the invention is being described referring to the drawings. The schematic drawings may have a mismatch to each other only due to different magnifications in each direction.

[First Aspect of the Invention]

A machine tool 1 of the invention comprises a supporting unit 10 (a base 11, for example) and a moving unit 20 (a movable table 21, for example). A sliding surface 13 of the supporting unit 10 faces a sliding surface 23 of the moving unit 20. The moving unit 20 slides against the supporting unit 10. An oil groove 16 is formed on an unexposed portion 13b of the sliding surface 13 of the supporting unit 10. An oil groove 26 is formed on an unexposed portion 23b of the sliding surface 23 of the moving unit 20. An oil inlet 52 is formed on one of the oil groove 16 and the oil groove 26. The oil groove where the oil inlet is formed is referred to as an oil groove 30 while the oil groove where the oil inlet is not formed is referred to as an oil groove 40. Lubricant fed through the oil inlet 52 is supplied to the oil groove 40 via the oil groove 30.

The invention eliminates the need of providing the oil groove 40 with an oil inlet since oil is supplied to the oil groove 40 via the oil groove 30 where the oil inlet 52 is formed. The invention provides a machine tool capable of expanding the slidable range of the moving unit without making the oil feeding system complicated.

The supporting unit may be fixed or movable. The supporting unit may be whatever can be a base against which the moving unit slides. The exposed portion of the sliding surface may be provided either for the supporting unit or for the moving unit or both. The unexposed portion of the sliding surface may be either the whole or part of the sliding surface of the supporting unit. The unexposed portion of the sliding surface may be either the whole or part of the sliding surface of the moving unit. The oil grooves on the supporting unit and the moving unit need not always be connected to each other. They are only required to be connected at least when lubricant is supplied to the oil groove where the oil inlet is not formed via the oil groove where the oil inlet is formed. All remarks are also applied to the second aspect of the invention.

[Second Aspect of the Invention]

The moving unit 20 may vertically slide against the supporting unit 10 within a predetermined range R1. The lowermost part of the oil groove 30 (a lowermost part 26b of the oil groove 26 in FIG. 4, for example) may be in a position not higher than the lowermost part of the oil groove 40 (a lowermost part 16b of the oil groove 16, for example). The oil inlet 52 may be formed on the lowermost part 26b of the oil groove 30. Lubricant fed through the oil inlet 52 first enters the lowermost part 26b of the oil groove 30. The oil inlet 52 may be in a position not higher than the lowermost part 16b of the oil groove 40. Lubricant fed through the oil inlet 52 is supplied to the oil groove 40 via the oil groove 30. Lubricant is efficiently supplied to both the oil groove 30 and the oil groove 40.

When the moving unit slides upward and downward, the vertical direction may be at a right angle and at any angle other than the right angle. The lowermost part of one of the oil grooves may be in a position not higher than the lowermost part of the other of the oil grooves. Even when one of the oil grooves is at the uppermost position, the lowermost part thereof may be lower than the lowermost part of the other of the oil grooves. Further, when one of the oil grooves is at the uppermost position, the lowermost part thereof may be at the same height as the lowermost part of the other of the oil grooves. Further, there is another aspect of the invention in which the moving unit may horizontally move.

(2) EXAMPLE OF THE MACHINE TOOL

FIG. 1 is a schematic view of an NC (numerical control) lathe as an example of a machine tool 1. The machine tool 1 comprises an NC apparatus 80, a headstock 82 mounted on a fixed base 81, a back-spindle base 85 mounted on a fixed base 84, and a tool post 2 mounted on a fixed base 11. The NC apparatus 80 controls the headstock 82, the back-spindle base 85, and the tool post 2.

The headstock 82 is movable in a Z-axis direction along a spindle axis AX1. The NC apparatus 80 controls the position of the headstock 82 in the Z-axis direction by a headstock driving unit (not shown). A spindle 83 mounted on the headstock 82 releasably grips a cylindrical (bar) workpiece W1 inserted in the Z-axis direction. The spindle 83 rotates the workpiece W1 on the spindle axis AX1 along the longitudinal direction of the workpiece W1. The spindle 83 is also referred to as a main spindle for differentiation from a back spindle. The Z-axis direction may be a horizontal direction but not limited to.

The back-spindle base 85 is movable in the Z-axis direction along a spindle axis AX2 and a Y-axis direction perpendicular to the Z-axis direction. The NC apparatus 80 controls the position of the back-spindle base 85 in the Z-axis direction and the Y-axis direction by a back-spindle base driving unit (not shown). A back spindle 86 mounted on the back-spindle base 85 releasably grips a front-finished workpiece W2 inserted in the Z-axis direction. The back spindle 86 rotate the front-finished workpiece W2 on the spindle axis AX2. The back spindle 86 is also referred to as an opposite spindle for differentiation from the main spindle. The Y-axis direction may be a horizontal direction but not limited to.

The tool post 2 is movable in an X-axis direction perpendicular to the Z-axis direction and the Y-axis direction. A plurality of tools T1 are attached to the tool post 2 to machine the back side of the workpiece W2. The NC apparatus 80 controls the position of the tool post 2 in the X-axis direction by a tool post driving unit (not shown). The X-axis direction may be a vertical direction but not limited to. The movable table 21 of the tool post 2 is an example of the moving unit 20 while the base 11 is an example of the supporting unit 10. The tool post 2 may machine the front side of the workpiece W1. Another tool post may be provided to machine the front side of the workpiece W1. The tool post 2 may be turned to change the orientation of the tools. The moving direction of the headstock 82, the back-spindle base 85, and the tool post is not limited to the direction shown in FIG. 1.

(3) EXAMPLE OF THE SUPPORTING UNIT AND THE MOVING UNIT

Figure 2:
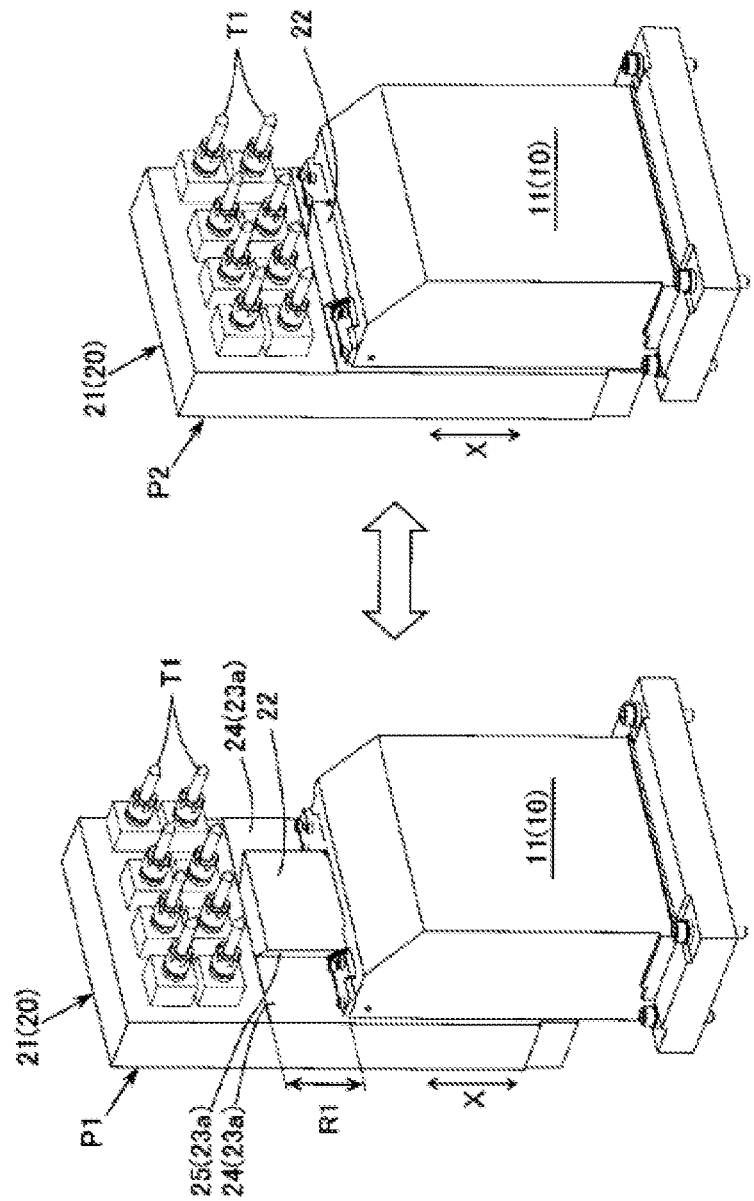
FIG. 2 is a perspective view of the supporting unit and the moving unit.
Figure 3:
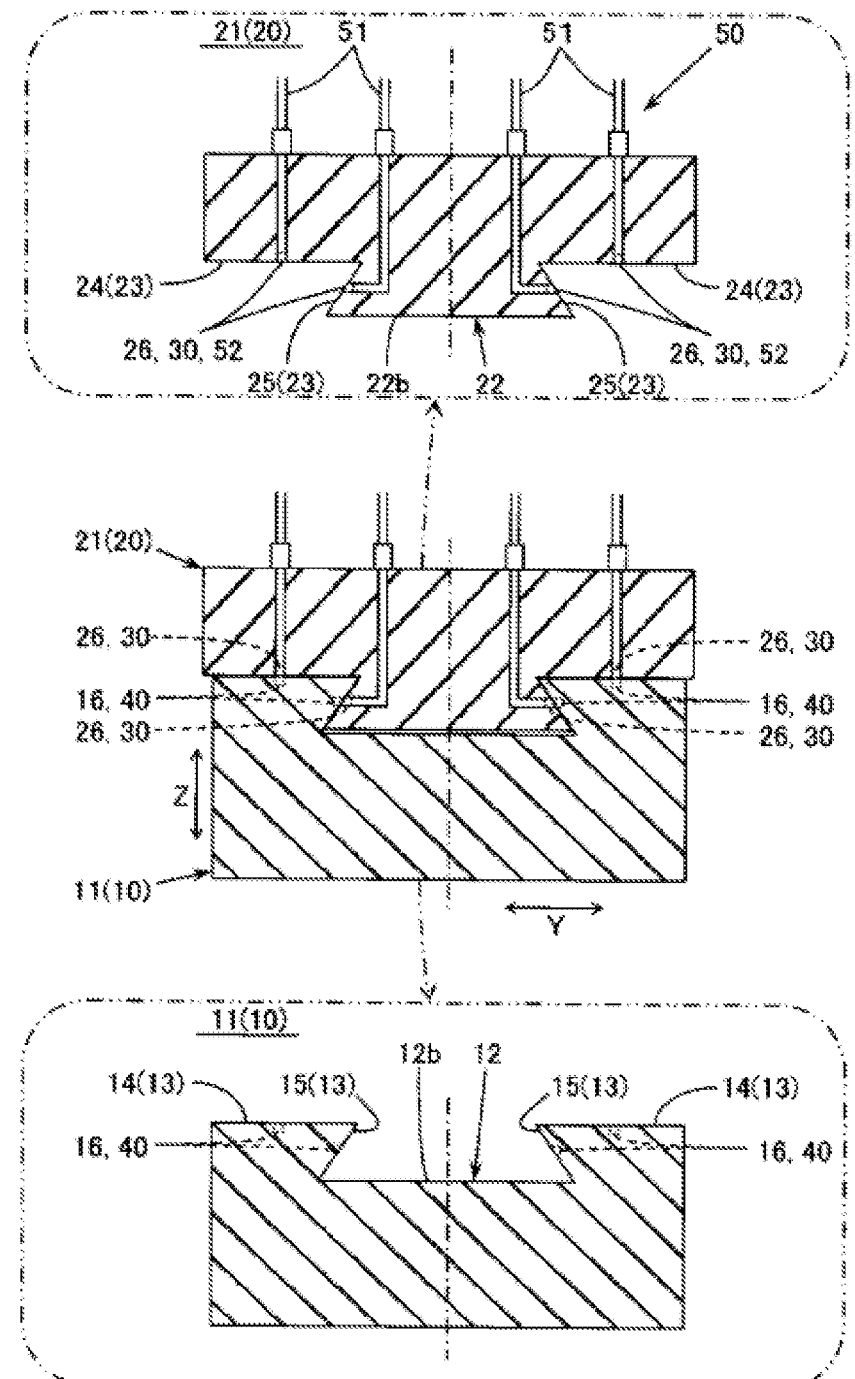
FIG. 3 is a horizontal sectional view of the supporting unit and the moving unit.
Figure 4:
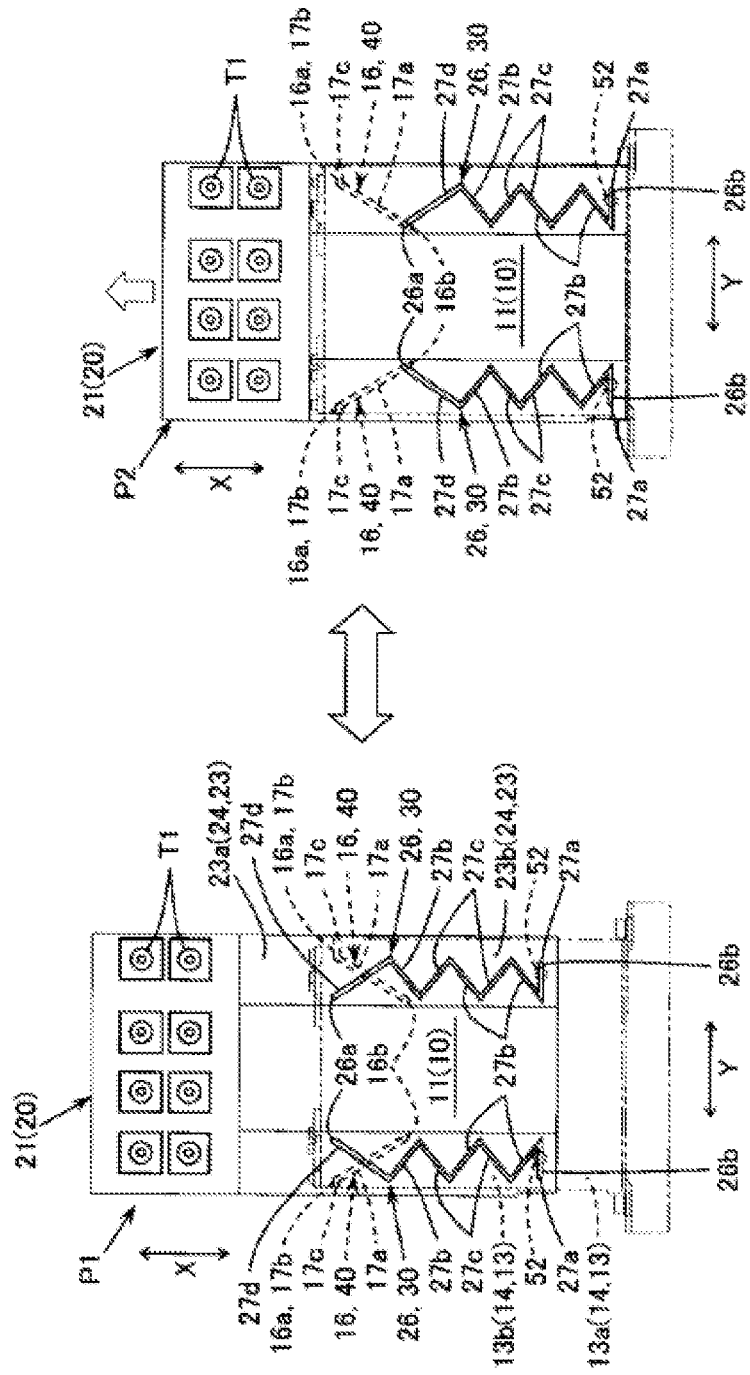
FIG. 4 is a front view of the moving unit as if the supporting unit is removed.
Figure 5:
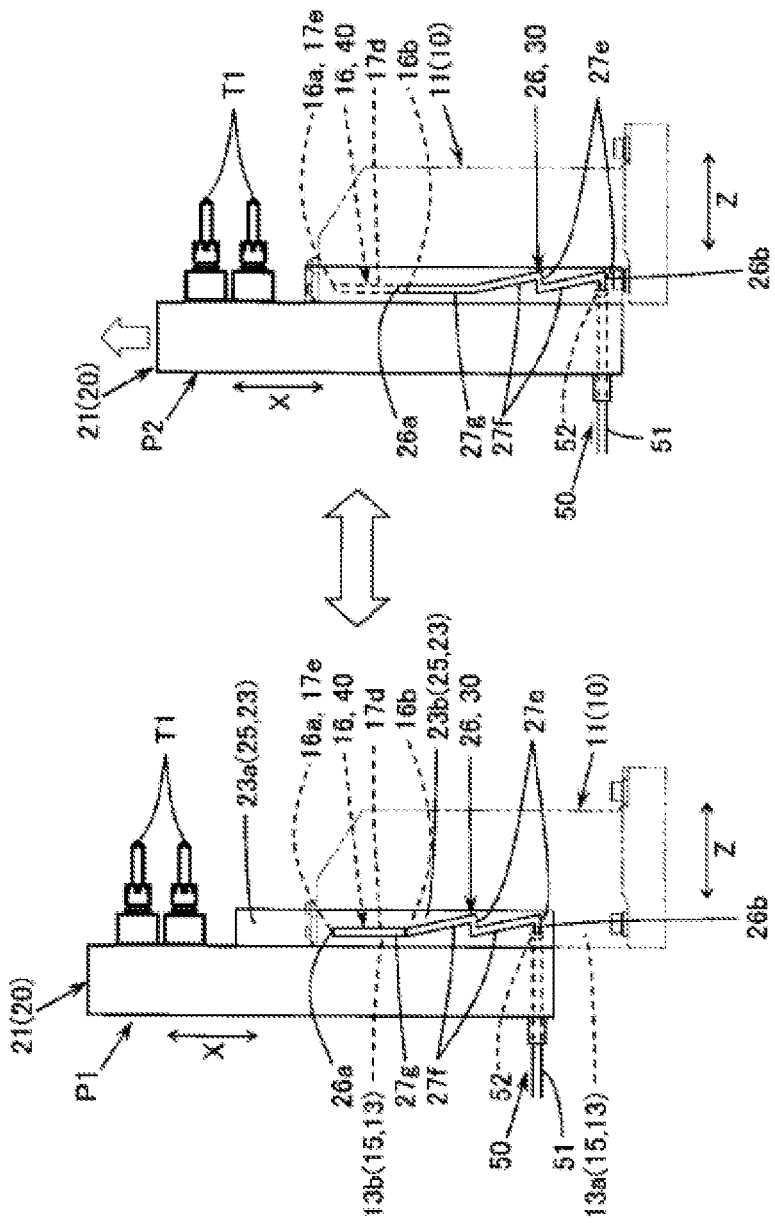
FIG. 5 is a side view of the moving unit as if the supporting unit is removed.

FIG. 2 shows an appearance of the base 11 and the movable table 21. FIG. 3 shows a horizontal sectional view of the base 11 and the movable table 21 by passing through the oil inlet 52. The movable table 21 is shown above while the base 11 below. FIG. 4 shows the front view of the movable table 21 where the base 11 is illustrated by a two-dot chain line. FIG. 5 shows the left side view of the movable table 21 of FIG. 4 where the base 11 is illustrated by a two-dot chain line. The movable table 21 is in the uppermost position P1 in FIGS. 2, 4, and 5. The movable table 21 is in the lowermost position P2 in FIGS. 2, 4, and 5.

The fixed base 11 has a concave dovetail groove 12. The dovetail groove 12 having a trapezoidal horizontal cross section is formed on a sliding surface 14 of the base 11. The dovetail groove 12 is longitudinally extended in the X-axis direction. The dovetail groove 12 is formed from a bottom 12b and oblique sliding surfaces 15 connected to the bottom 12b. The sliding surface 14 outside the dovetail groove 12 and the sliding surfaces 15 inside the dovetail groove 15 are collectively called the sliding surface 13.

The movable table 21 has a convex dovetail 22. The dovetail 22 having a trapezoidal horizontal cross section is formed on a sliding surface 24 of the moving unit 20 opposite the sliding surface 14 of the base 11. The dovetail 22 is longitudinally extended is in the X-axis direction. The movable table 21 vertically slide against the base 11 within the predetermined range R1 due to engagement of the dovetail 22 with the dovetail groove 12. The dovetail 22 is formed from a bottom 22b and oblique sliding surfaces 25 connected to the bottom 22b. The sliding surface 24 outside the dovetail 22 and the sliding surfaces 25 opposite the sliding surfaces 15 of the base 11 are collectively called the sliding surface 23. The movable table 21 is guided in a slidable manner with the sliding surface 23 of the movable table 21 facing the sliding surface 13 of the base 11. There is a gap formed between the bottom 22b of the movable table 21 and the bottom 12b of the base 11.

As shown in FIGS. 2, 4, and 5, the movable table 21 is movable in the X-axis direction between the uppermost position P1 and the lowermost position P2. The upper end of the sliding surface 23 of the movable table 21 held in the uppermost position P1 is higher than the upper end of the sliding surface 13 of the base 11. The sliding surface 23 of the movable table 21 thereby has an exposed portion 23a and the unexposed portion 23b always hidden by the sliding surface 13 of the base 11. The lower end of the sliding surface 13 of the base 11 is lower than the lower end of the sliding surface 23 of the movable table 21 held in the uppermost position P1. The sliding surface 13 of the base 11 thereby has an exposed portion 13a and the unexposed portion 13b always hidden by the sliding surface 23 of the movable table 21.

Any oil groove, if formed on the exposed portions 13a, 23a, would cause leakage of oil or biting of chips. The oil groove 16 is therefore formed on the unexposed portion 13b while the oil groove 26 is formed on the unexposed portion 23b. Particularly, the oil groove 16 is formed on the sliding surface 14 and each of the sliding surfaces 15 while the oil groove 26 is formed on the sliding surface 24 and each of the sliding surfaces 25.

The oil inlet 52 is formed on the lowermost part 26b of the oil groove 26. The oil inlet 52 is connected to a pipe 51 of an oil feeder 50. The oil groove 16 where the oil inlet is not formed receives lubricant from the oil groove 26. The oil groove 26 is an example of the oil groove 30 where the oil inlet is formed. The oil groove 16 is an example of the oil groove 40 where the oil inlet is not formed. The lowermost part 26b of the oil groove 26 may always be in a position lower than the lowermost part 16b of the oil groove 16. When the movable table 21 is in the uppermost portion P1, the lowermost part 26b of the oil groove 26 may be at the same height as the lowermost part 16b of the oil groove 16.

Lubricant is intermittently supplied to the oil inlet 52 from the oil feeder 50. For example, the oil feeder 50 regularly opens a valve in an oil supply period and closes the valve when the period ends. In this embodiment, lubricant is supplied to the oil inlet 52 in the oil supply period regardless of the position of the movable table 21 in the X-axis direction. The opening of the oil groove 16 of the base 11 is arranged to always face the opening of the oil groove 26 of the movable table 21. The oil groove 16 and the oil groove 26 are therefore always connected somewhere.

As shown in FIG. 4, the oil groove 26 formed on the sliding surface 24 of the movable table 21 is formed from a horizontal section 27a, an outward incline 27b, an inward incline 27c, another outward incline 27b, another inward incline 27c, another outward incline 27b, and an inward incline 27d in order between the lowermost part 26b and an uppermost part 26a of the oil groove 26. The horizontal section 27a at the lowermost part 26b is extended in the Y-axis direction. The oil inlet 52 is formed somewhere in the horizontal section 27a. The outward incline 27b rises up from the lower section (the horizontal section 27a or the inward incline 27c) toward the outside in the Y-axis direction. The inward incline 27c rises up from the lower outward incline 27b toward the inside in the Y-axis direction. The inward incline 27d rises up from the lower outward incline 27b toward the uppermost part 26a. The inward incline 27d is always connected to the oil groove 16 of the base 11 somewhere. The inward incline 27d is closed at the uppermost part 26a.

The oil groove 16 formed on the sliding surface 14 of the base 11 is formed from an outward incline 17a between the lowermost part 16b and an uppermost part 16a and a horizontal section 17b at the uppermost part 16a. The outward incline 17a is arranged to once intersect with the inward incline 27d to have a single intersection. The horizontal section 17b is extended in the Y-axis direction from the outward incline 17a to an oil outlet 17c. Since the outward incline 17a obliquely rises toward the outside in the Y-axis direction, the horizontal section 17b provided with the oil outlet 17c can be shortened. The oil groove 16 therefore retains oil for a longer period.

Lubricant fed through the oil inlet 52 is supplied to the horizontal section 27a, the outward incline 27b, the inward incline 27c, the outward incline 27b, the inward incline 27c, the outward incline 27b, and the inward incline 27d of the oil groove 26 on the sliding surface 24 of the movable table 21 in order. Lubricant supplied to the inward incline 27d is then supplied to the outward incline 17a and the horizontal section 17b of the oil groove 16 in order since the inward incline 27d of the movable table 21 is connected to the outward incline 17a of the base 11. Accordingly, as shown in FIG. 4, lubricant is supplied to the exposed portion 23a of the sliding surface 24 of the movable table 21 from the oil groove 16 of the base 11 when the movable table 21 is moved downward. The oil groove 16 of the base 11 is not provided with an oil inlet.

The inward incline 27d of the oil groove 26 and the outward incline 17a of the oil groove 16 are differently oriented. When the movable table 21 is moved in the X-axis direction, the intersection of the inward incline 27 and the outward incline 17a is shifted in the Y-axis direction. Lubricant is efficiently spread over the whole surface of the sliding surface 14 and the sliding surface 24. Lubricant is supplied to the exposed portion 13a of the sliding surface 14 of the base 11 from the oil groove 26 of the movable table 21 when the movable table 21 is moved downward.

As shown in FIG. 5, the oil groove 26 formed on the sliding surface 25 of the movable table 21 is formed from a horizontal section 27e, an incline 27f, another horizontal section 27e, another incline 27f, and a vertical section 27g in order between the lowermost part 26b and the uppermost part 26a. The horizontal section 27e at the lowermost part 26b is horizontally extended from the oil inlet 52 to the incline 27f. The incline 27f rises up from the lower horizontal section 27e toward the upper section (the horizontal section 27e or the vertical section 27g). The vertical section 27g rises up from the upper incline 27f toward the uppermost part 26a. The vertical section 27g is always connected to the oil groove 16 of the base 11 somewhere. The incline 27f is closed at the uppermost part 26a.

The oil groove 16 formed on the sliding surface 15 of the base 11 is formed from a vertical section 17d rising up between the lowermost part 16b and the uppermost part 16a and a horizontal section 17e at the uppermost part 16a. At least part of the horizontal section 17e is arranged to overlap with the vertical section 27g of the movable table 21. The horizontal section 17e is extended in the Y-axis direction from the vertical section 17d to an oil outlet (not shown).

Lubricant fed through the oil inlet 52 is supplied to the horizontal section 27e, the incline 27f, the horizontal section 27e, the incline 27f, and the vertical section 27g of the oil groove 26 on the sliding surface 25 of the movable table 21 in order. Lubricant supplied to the vertical section 27g is then supplied to the vertical section 17d and the horizontal section 17e of the oil groove 16 in order since the vertical section 27g of the movable table 21 is connected to the vertical section 17d of the base 11. Accordingly, lubricant is supplied to the exposed portion 23a of the sliding surface 25 of the movable table 21 from the oil groove 16 of the base 11 when the movable table 21 is moved downward. The oil groove 16 of the base 11 is not provided with an oil inlet. Lubricant is supplied from the oil groove 26 of the movable table 21 to the exposed portion 13a of the sliding surface 15 of the base 11 when the movable table 21 is moved downward.

If an oil inlet is formed somewhere but at the lowermost part 26b, any part of the oil groove 26 (and the oil groove 16) lower than the position of the oil inlet is possibly short of lubricant. Similarly, if an oil inlet is formed somewhere but at the lowermost part 16b, any part of the oil groove 16 (and the oil groove 26) lower than the position of the oil inlet is possibly short of lubricant. This is because any air bubble generated in the oil groove 26 on the sliding surface 24 (or in the oil groove 16 on the sliding surface 14) is difficult to be pushed out by lubricant. Lubricant fed through the oil inlet formed at the lowermost part could push an air bubble toward the upper oil outlet 17c. Lubricant fed through the oil inlet formed somewhere but at the lowermost part could not push an air bubble since the horizontal section 27a is closed at the lowermost part 26b. The oil inlet may be formed not only at the end of the horizontal section 27a but anywhere thereof. Lubricant fed from under (from a place lower than the horizontal section 27a) could push any bubble generated in the horizontal section 27 upward and finally into the outward incline 27b. Such structure may be applied to the oil groove 26 on the sliding surface 25 and the oil groove 16 on the sliding surface 15. An oil inlet formed on the lowermost part of the oil groove 16 and the lowermost part of the oil groove 26, whichever is lower, could efficiently supply oil both the oil grooves 16 and 26. Further, such efficient oil supply is also available when the lowermost part 26b of the oil groove 26 in the uppermost position P1 is at the same height as the lowermost part 16b of the oil groove 16.

The invention eliminates the need of providing the oil groove 16 with the oil inlet 52 and the need of providing the base 11 with an oil pipe since oil fed through the oil inlet 52 is supplied to the oil groove 16 via the oil groove 26. The embodiment provides a machine tool capable of expanding the slidable range of the movable table 21 without making the oil feeding system complicated.

(4) MODIFIED EMBODIMENT OF THE INVENTION

There may be various modified embodiments of the invention. For example, the moving unit may be a movable table of a front-working tool post, any component of the headstock 82, or any component of the back-spindle base 85. The sliding direction of the moving unit may be a horizontal direction or an oblique direction. The supporting unit may be any base against which the moving unit is slidable. The supporting unit may be the base 81 or the base 84. The invention may be applied to an NC automatic lathe and any type of machine tools.

The sliding surface 15 of the dovetail groove 12 may be provided with a gib to adjust a gap with the sliding surface 25 of the dovetail 22. The gib may serve as the sliding surface 15. The sliding surface 25 of the dovetail 22 may be provided with a gib. The slide structure is not limited to the engagement structure of the dovetail and the dovetail groove. Any structure may be used such as a groove having a square cross section and a projection engageable with the groove.

The oil inlet may be formed on the oil groove 16 of the supporting unit. The base 11 then may be provided with a pipe connected to the oil inlet. Lubricant fed through the oil inlet may be supplied to the oil groove 26 via the oil groove 16. The oil feeding system would be further simplified since the oil piping is still stationary when the movable table 21 slides. The oil groove 16 and the oil groove 26 are not necessarily always connected to each other. They are only necessarily connected just when the oil feeder 50 opens a valve to feed oil to the oil inlet 52. For example, when the movable table 21, on which a position sensor is attached, is detected to reach the intersection of the oil groove 16 and the oil groove 26, the oil feeder 50 may open a valve to feed oil to the oil inlet 52.

There may be various oil groove structures. For example, without an oil outlet at the uppermost part 16a of the oil groove 16, the oil feeder 50 can use pressure to supply oil fed through the oil inlet 52 to the oil groove 16 via the oil groove 26. The shape of the oil groove is not limited to the one shown in FIGS. 4 and 5.

Figure 6:
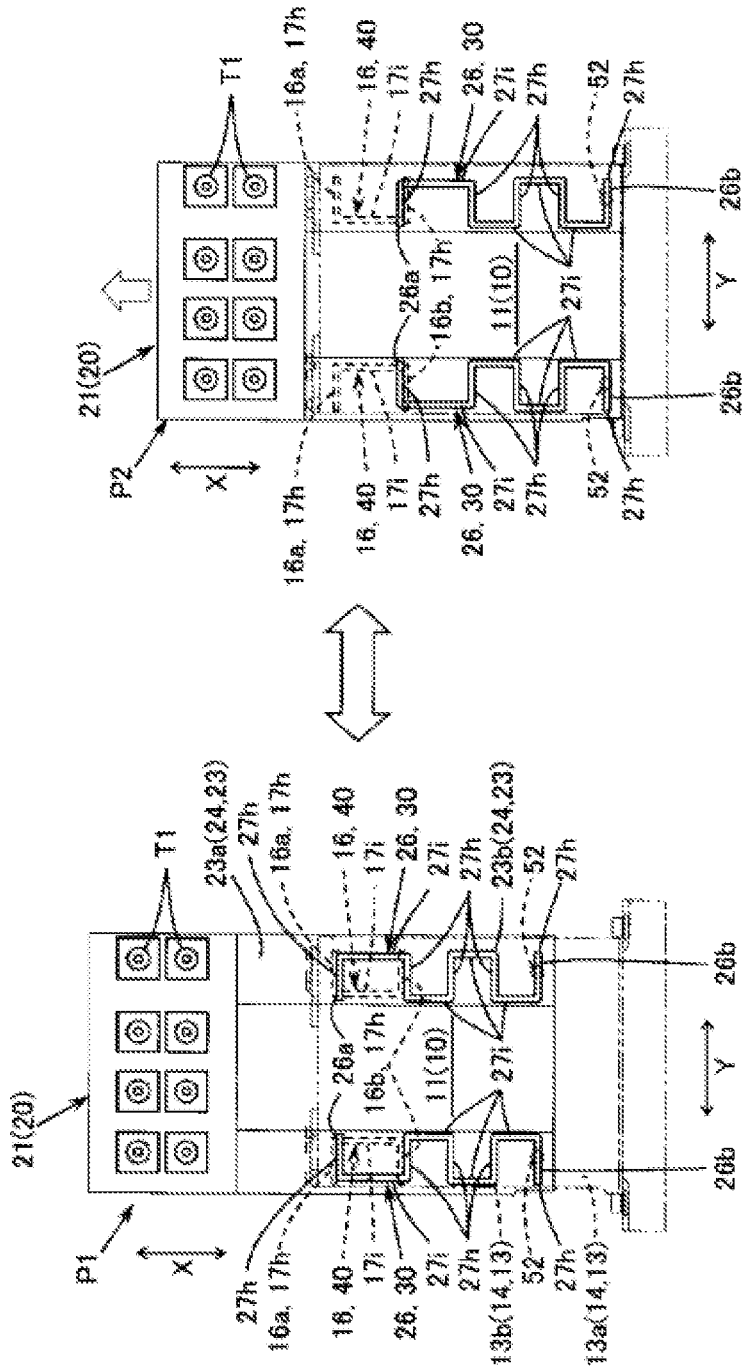
FIG. 6 is another front view of the moving unit as if the supporting unit is removed.

FIG. 6 shows a front view of the movable table 21 where the base 11 is illustrated by a two-dot chain line. On the left shown is the movable table 21 in the uppermost position P1. On the right shown is the movable table 21 in the lowermost position P2. The common parts and elements to previous drawings are of the same symbols and the explanation is omitted.

The oil groove 26 on the sliding surface 24 of the movable table 21 is formed from alternatively arranged five horizontal sections 27h and four vertical sections 27i. One of the horizontal sections 27h is at the lowermost part 26b and another horizontal sections 27h is at the uppermost part 26a. Each horizontal section 27h is extended in the Y-axis direction. The oil inlet 52 is provided somewhere in the horizontal section 27h at the lowermost part 26b. Each vertical section 27i is extended in the X-axis direction.

The oil groove 16 on the sliding surface 14 of the base 11 is formed from horizontal sections 17h and a vertical section 17i. One of the horizontal sections 17h is at the lowermost part 16b and the other is at the uppermost part 16a. The vertical section 17i is extended between the lowermost part 16b and the uppermost part 16a. The horizontal section 17h at the lowermost part 16b is arranged to once intersect with somewhere in the uppermost vertical section 27i of the movable table 21. The vertical section 17i is arranged to once intersect with somewhere in the horizontal section 27h at the uppermost part 26a.

The oil grooves 16 and 26 are connected at the two intersections. This embodiment eliminates the need of providing the base 11 with an oil pipe since oil fed through the oil inlet 52 is supplied to the oil groove 16 via the oil groove 26. Such structure may be applied to the oil groove on the sliding surface 15 and the oil groove on the sliding surface 25.

Figure 7:
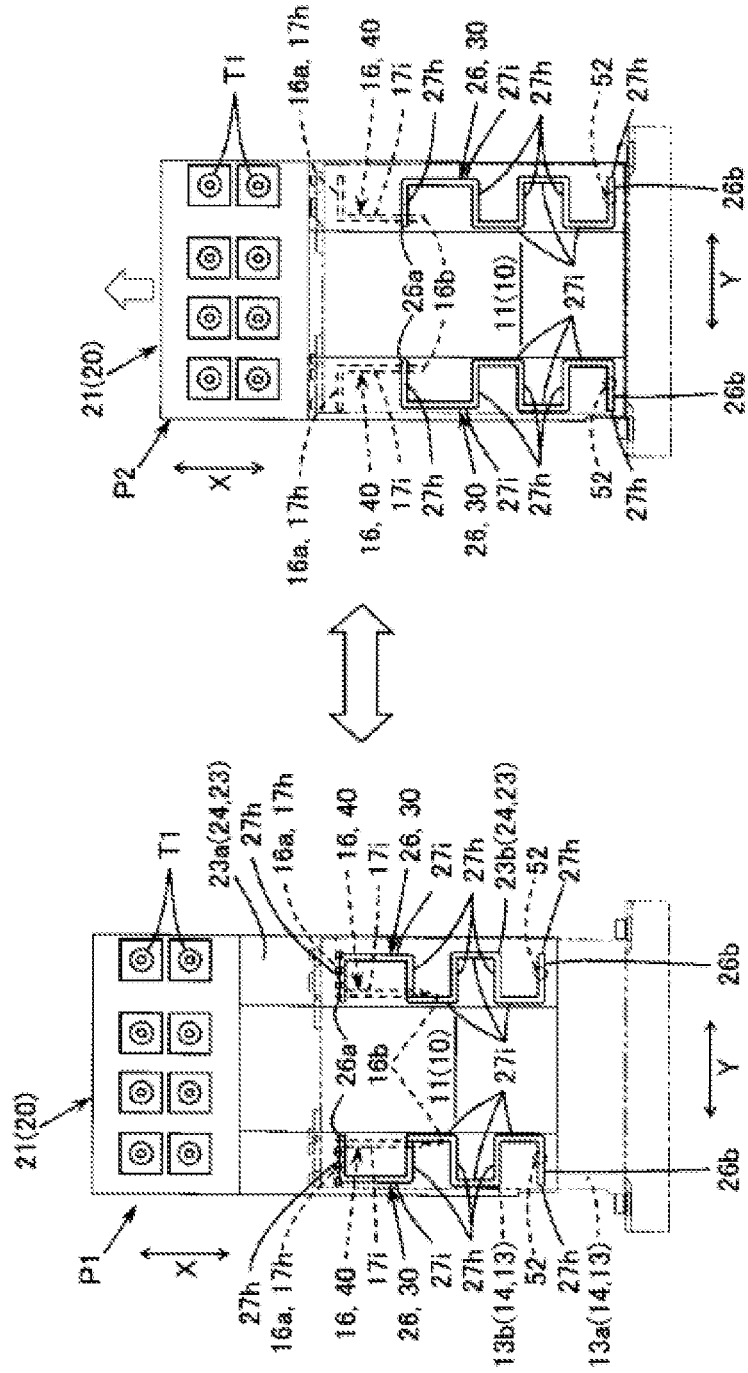
FIG. 7 is another front view of the moving unit as if the supporting unit is removed.

In FIG. 7, the oil groove 16 on the sliding surface 14 of the base 11 is formed from a single vertical section 17i and a single horizontal section 17h. The vertical section 17i is extended between the lowermost part 16b and the uppermost part 16a in the X-axis direction. The horizontal section 17h is at the uppermost part 16a. The vertical section 17i is arranged to once intersect with somewhere in the horizontal section 27h at the uppermost part 26a. The oil grooves 16 and 26 are connected at a single intersection. This embodiment eliminates the need of providing the base 11 with an oil pipe since oil fed through the oil inlet 52 is supplied to the oil groove 16 via the oil groove 26. Such structure may be applied to the oil groove on the sliding surface 15 and the oil groove on the sliding surface 25.

Figure 8:
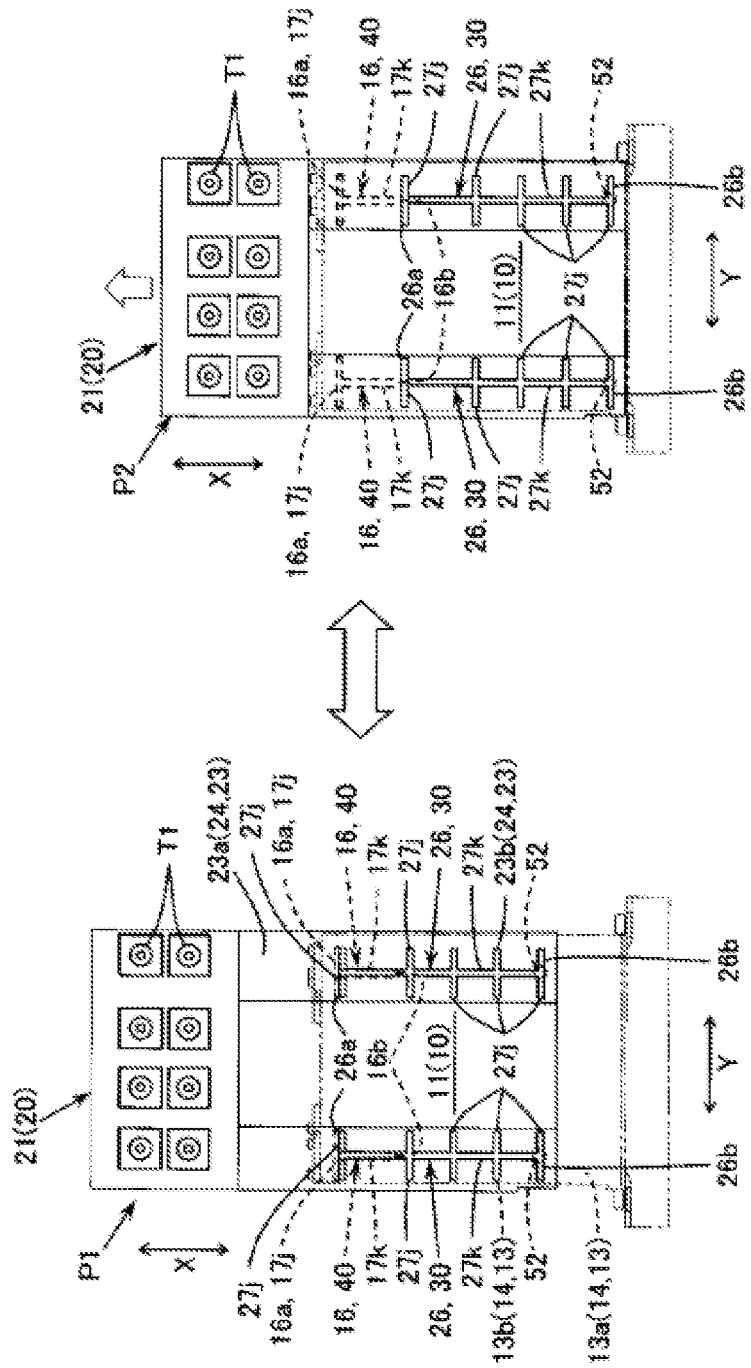
FIG. 8 is another front view of the moving unit as if the supporting unit is removed.

In FIG. 8, the oil groove 26 on the sliding surface 24 of the movable table 21 is formed from a vertical section 27k and five horizontal sections 27j. The vertical section 27k is extended between the lowermost part 26b and the uppermost part 26a. The horizontal section 27j is each arranged to be perpendicular to the vertical section 27*k*. The oil inlet 52 is formed somewhere in the horizontal section 27*j* at the lowermost part 26*b*. The oil groove 16 on the sliding surface 14 of the base 11 is formed from a vertical section 17*k* and a horizontal section 17*j*. The vertical section 17*k* is extended between the lowermost part 16*b* and the uppermost part 16*a*. The horizontal section 17*j* is arranged to be perpendicular to the vertical section 17*k*. At least part of the vertical section 17*k* of the oil groove 16 is always connected to the vertical section 27*k* of the oil groove 26.

This embodiment eliminates the need of providing the base 11 with an oil pipe since oil fed through the oil inlet 52 is supplied to the oil groove 16 via the oil groove 26. Such structure may be applied to the oil groove on the sliding surface 15 and the oil groove on the sliding surface 25.

(5) CONCLUSION

The invention provides a machine tool capable of expanding the slidable range of the moving unit without making the oil feeding system complicated. The basic functions and effects are available even if the technology includes only the elements in the independent claim (including the embodiment) and not the elements in the dependent claims. The invention includes any replacement or exchange of the configurations disclosed in the embodiments and the modifications. The invention also includes any replacement or exchange of the prior arts and the configurations disclosed in the embodiments and the modifications.

What is claimed is:

1. A machine tool in which a moving unit slides against a supporting unit with a sliding surface of the supporting unit facing a sliding surface of the moving unit, the machine tool comprising:
    a first oil groove formed on an unexposed portion of the sliding surface of the supporting unit;
    a second oil groove formed on an unexposed portion of the sliding surface of the moving unit;
    and
    an oil inlet formed on one of the first oil groove and the second oil groove,
    wherein the first oil groove and the second oil groove are arranged to have an intersection therebetween and
    wherein lubricant fed through the oil inlet is supplied to the other of the first oil groove and the second oil groove via the one of the first oil groove and the second oil groove and the intersection.

2. The machine tool of claim 1 wherein the moving unit slides against the supporting unit within a predetermined range,
    a lowermost part of one of the first oil groove and the second oil groove is in a position not higher than a lowermost part of the other of the first oil groove and the second oil groove, and
    the oil inlet is formed on the lowermost part of the one of the first oil groove and the second oil groove.

* * * * *